(12) United States Patent
Conner et al.

(10) Patent No.: US 7,616,650 B2
(45) Date of Patent: Nov. 10, 2009

(54) VIDEO FLOW CONTROL AND NON-STANDARD CAPABILITY EXCHANGE FOR AN H.320 CALL LEG

(75) Inventors: Mark J. Conner, Boulder Creek, CA (US); Sabita Jasty, San Jose, CA (US); Yu Zhang, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 11/702,341

(22) Filed: Feb. 5, 2007

(65) Prior Publication Data

US 2008/0186848 A1 Aug. 7, 2008

(51) Int. Cl.
*H04L 12/28* (2006.01)
(52) U.S. Cl. .................. 370/401; 370/260; 370/395.21
(58) Field of Classification Search ........................ None
See application file for complete search history.

(56) References Cited

U.S. PATENT DOCUMENTS

| | | | |
|---|---|---|---|
| 4,684,872 A | 8/1987 | Stewart | |
| 5,953,049 A | 9/1999 | Horn et al. | |
| 6,016,430 A | 1/2000 | Shinomiya | |
| 6,044,081 A | 3/2000 | Bell et al. | |
| 6,253,270 B1 | 6/2001 | Ajanovic et al. | |
| 6,275,889 B1 | 8/2001 | Saito | |
| 6,584,093 B1* | 6/2003 | Salama et al. | 370/351 |
| 6,590,867 B1 | 7/2003 | Ash et al. | |
| 6,611,516 B1* | 8/2003 | Pirkola et al. | 370/352 |
| 6,771,644 B1 | 8/2004 | Brassil et al. | |
| 6,876,632 B1 | 4/2005 | Takeda | |
| 6,947,417 B2 | 9/2005 | Laursen et al. | |
| 7,043,749 B1* | 5/2006 | Davies | 725/120 |
| 7,330,460 B1* | 2/2008 | Hagirahim et al. | 370/352 |
| 7,422,330 B2 | 9/2008 | Magaril | |
| 2002/0014282 A1 | 2/2002 | Andersson et al. | |
| 2002/0051464 A1 | 5/2002 | Sin et al. | |
| 2002/0186661 A1 | 12/2002 | Santiago et al. | |
| 2003/0035384 A1 | 2/2003 | Cline et al. | |
| 2003/0058836 A1* | 3/2003 | Even | 370/352 |
| 2003/0076850 A1 | 4/2003 | Jason, Jr. | |

(Continued)

FOREIGN PATENT DOCUMENTS

EP 1 553 735 A1 7/2005

*Primary Examiner*—Phirin Sam
(74) *Attorney, Agent, or Firm*—The Law Offices of Bradley J. Bereznak

(57) ABSTRACT

In one embodiment, a system includes first and second gateway devices operable to communicate with respective first and second video terminals in accordance with H.323, the first and second gateway devices also being operable to communicate with each other over an H.320 call leg. Responsive to a first message received from the first video terminal that contains a terminal capability in H.245, the first gateway mapping the terminal capability into a non-standard section of an H.221 data stream, and send the data stream to the second gateway device. The second gateway device decoding the terminal capability from the non-standard section, encoding the terminal capability in H.245 in a second message, and sending the second message to the second video terminal. It is emphasized that this abstract is provided to comply with the rules requiring an abstract that will allow a searcher or other reader to quickly ascertain the subject matter of the technical disclosure.

15 Claims, 4 Drawing Sheets

U.S. PATENT DOCUMENTS

| | | |
|---|---|---|
| 2003/0163272 A1 | 8/2003 | Kaburlasos et al. |
| 2004/0008668 A1* | 1/2004 | Droz .......................... 370/352 |
| 2004/0022237 A1* | 2/2004 | Elliott et al. ................ 370/356 |
| 2004/0073690 A1 | 4/2004 | Hepworth et al. |
| 2004/0213152 A1 | 10/2004 | Matuoka et al. |
| 2004/0252651 A1* | 12/2004 | Karlsen et al. .............. 370/264 |
| 2004/0252681 A1* | 12/2004 | Rabipour et al. ........... 370/360 |
| 2005/0007959 A1 | 1/2005 | Tomonada et al. |
| 2007/0008896 A1 | 1/2007 | Green et al. |
| 2007/0121523 A1 | 5/2007 | Morandin |
| 2008/0143816 A1* | 6/2008 | Zhang et al. ............. 348/14.01 |

* cited by examiner

VIDEO FLOW CONTROL AND NON-STANDARD CAPABILITY EXCHANGE FOR AN H.320 CALL LEG

TECHNICAL FIELD

The present disclosure relates generally to the field of video communications over networks with interworking; that is, the mapping of call and media signaling messages between two different protocol suites.

BACKGROUND

There are a series of known standards that provide a foundation for audio, video, and data communications across a variety of networks. For example, the International Telecommunications Union (ITU) is one standards body that is responsible for the defining these standards. Generally for the ITU, the standards fall in the H.32× series of standards. For example, the H.323 standard is an umbrella recommendation from the ITU that sets standards for multimedia communications over Local Area Networks (LANs). H.320 is another umbrella suite of recommendations, which covers audio/video telephony on switched digital circuits. H.320 establishes standards for compression/decompression of audio and video data streams as well as standards for multiplexing of data streams. Examples of Public Switched Telephone Network (PSTN) protocols that are currently in widespread use that can pass H.320 calls include Signaling System #7 (SS7), Integrated Services Digital Network (ISDN), and other digital protocols to numerous to list that can support at least 56K clear channel calls. By adhering to standards, multimedia products and applications from multiple vendors can interoperate, allowing users to communicate without concern for compatibility.

When a video call is placed between two IP video terminals operating in accordance with the H.323 standard or other IP protocol capable of performing video, supporting video codec H.263, a set of capabilities are typically passed between the two terminals. Normally, all of these capabilities are passed transparently. However, if part of the call between the two terminals contains an H.320 call leg, not all of the H.263 capabilities can be passed transparently. This is due to limitations in the interworking between ITU specifications H.245 on the IP side and H.221/H.242 on the TDM side of the call. For instance, the StandardMPI and Pixel Aspect Ratio Code (PAR) fields within the Custom Picture Format (CPF) part of the capabilities do not exist in the H.242 specification for H.263. Thus, for calls using H.263 that traverse both IP, using H.323 or similar protocol, and PSTN, using the H.320 protocol, parts of the H.263 capabilities are lost. In addition, when a typical call is placed between two IP video terminals, a limited bandwidth connection is opened between the terminals for video. Normally, the maximum allowed bandwidth is used between the two terminals. However, in cases where bandwidth needs to be reduced during a call, a flow control indication may be sent from the terminal requiring the reduction of bandwidth. Unfortunately, when a video call includes an H.320 leg, the IP leg requiring the bandwidth reduction can overflow, causing disruptions in the video stream.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

Figure 1:
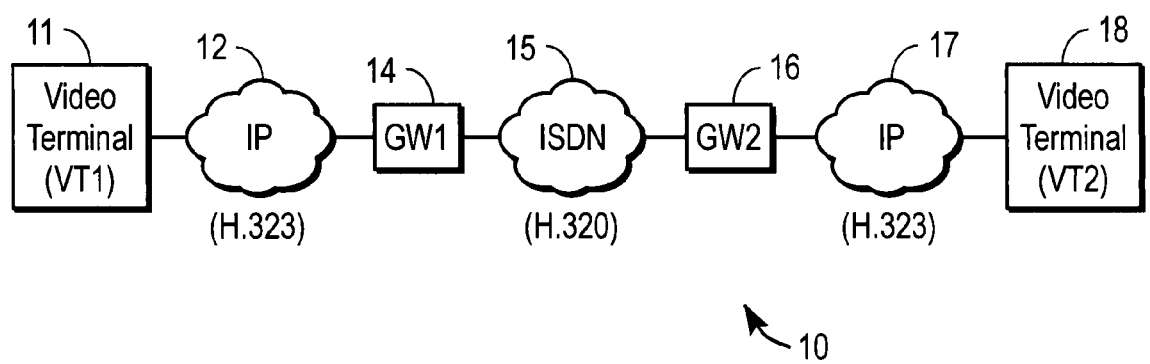
FIG. 1 illustrates an example communications network that includes two IP video terminals connected via an H.320 leg.

FIG. 1 illustrates an example communications network that includes two IP video terminals connected via an H.320 leg. Video terminals 11 and 18 may be any type of endpoint device capable of communicating over network 10. For example, video terminals 11 and 18 may each comprise personal computers (PCs) with built-in video capabilities such as a speaker, microphone, video display, and video camera. Video terminals 11 and 18 typically include standard audio and video codecs, and are operable to capture and transmit images of users and also display images of other users received from remote endpoints. Using video terminals 11 and 18 users may participate with each other, as well as with other participants, in a video conference session. Other endpoint devices not specifically shown in FIG. 1 that may also be used to communicate over network 10 include a personal digital assistant (PDA), a laptop or notebook computer, an IP telephone device, a non-IP telephone device, an audio/video appliance, a streaming client, a television device, programmable consumer electronics, or any other device, component, element, or object capable of initiating or participating in video exchanges over a network.

In the example of FIG. 1, three call legs are present. The first is between video terminal 11 and gateway device 14, and uses ITU standard H.323 over IP. The second call leg is between gateway 14 and gateway 16 over a TDM network 15 (e.g., a Q.931 ISDN PRI or BRI). The operating standard of network 15 is consistent with the H.320 standard and H.221/H.242 supporting specifications. The third call leg is between gateway device 16 and video terminal 18, which also uses ITU H.323 over IP. It should be understood that the H.323 and H.320 standards may be implemented in devices 14 & 16, as well as video terminals 11 & 18, entirely in software on a computer or network node, in dedicated hardware, or in some combination of both, i.e., firmware.

It is appreciated that in different specific implementations the media path for the video data may include audio/video transmissions, e.g., Real-Time Transport Protocol (RTP) packets sent across a variety of different networks (e.g., Intranet, Local Area Networks (LANS), etc.) with connections that span across multiple services, systems, and devices. These networks may include packet-switched Transmission Control Protocol/Internet Protocol (TCP/IP) and Inter-network Packet Exchange (IPX) networks over Ethernet, Fast Ethernet, and Token Ring network technologies. For example, IP networks 12 and 17 may be any packet switched network or any other network for carrying data. ISDN 15 may comprise any circuit-switched network carrying circuit-switched signals or other data. Furthermore, IP networks 12 and 17 and ISDN 15 may include wireless portions or may be completely wireless networks. It may also be understood that the principles of the invention may be usefully employed in any type of multimedia conferencing system.

Calls made over ISDN 15 using the H.320 suite of recommendations are usually based on aggregated communication channels (e.g., so called Bearer or "B" channels) with data throughput rates that are integer multiples of 64,000 bits per second (64K bps), but can include other Channel Types (e.g. H0, H11, or H12). Calls placed between video terminals 11 and 18 using network 10 are passed through gateway devices 14 and 16. Gateway devices 14 and 16 resolve protocol inconsistencies between the H.320 and H.323 video telecommunications protocols. Gateways perform translations between the different transmission formats and communication procedures, e.g., between H.323, H245, and H.225 associated with the IP video endpoints and the H.320, H.221 and Q.931 protocols associated with the ISDN call leg. That is, the gateway devices communicate with each other over ISDN network 15 and with their respective video terminals over corresponding IP networks. Gateways 14 & 16 translate data and other media between a format that is compatible with the ISDN standards and a format that is compatible with IP, including any protocol and media translation required to transmit media between the networks. For instance, in communicating with each other, gateway devices 14 and 16 utilize a constant signaling path in accordance with ITU protocol H.221, which specifies a mechanism for passing non-standard command information across the signaling path.

For the example of FIG. 1, the maximum bandwidth between the two gateways is 384K bits per second (bps), e.g., six TDM trunks times 64 Kbps each. Depending on the audio codec selected, the available video bandwidth may range from about 320 Kbps to 376 Kbps. For purposes of discussion, it may be assumed that the maximum bandwidth is 320 Kbps. After the call is established (i.e., all six TDM trunks active) a flow control message is sent to each video terminal; that is, gateway 12 sends a flow control message to video terminal 11, and gateway 16 sends a flow control message to video terminal 18. The flow control message has the value of 320 Kbps, indicating the maximum calculated bandwidth. From this, each video terminal realizes that it may send up to 320 Kbps of video/audio data to the other terminal, as needed.

In the event that either video terminal is unable to receive data at the specified rate, that terminal sends a flow control message (with less than 320 Kbps) directed toward its associated gateway device. For example, video terminal 11 may send such a message to gateway 12. In accordance with one embodiment, gateway 12 communicates this bandwidth limitation to gateway 16 using non-standard commands in the H.221 protocol. In other words, the non-standard command information of the H.221 protocol is utilized to encode the flow control message and pass it across the ISDN call leg signaling path. The receiving H.320 gateway device (i.e., gateway 16) then decodes the non-standard command and compares the value of the flow control to the maximum calculated bandwidth for the H.320 leg. Gateway 16 then sends a flow control message to video terminal 18 that includes the minimum of the two bandwidth values. Thus, in this example, video terminal 18 receives a flow control message sent in accordance with the H.323 standard that specifies a maximum transmission rate of 320 Kbps.

The same operations described above may also apply in the reverse direction, i.e., an H.323 compatible flow control message may be sent from video terminal 18 to gateway 16, that message may then be mapped to non-standard command(s) in the H.320 protocol suite by gateway 16 and then sent from gateway 16 to gateway 14; gateway 14 then maps the received non-standard command(s) back to a corresponding H.323 compatible flow control message that is then sent to video terminal 11.

In one embodiment, the non-standard capabilities and non-standard commands are identified by either the hexadecimal byte 0×FE (capabilities) or 0×FF (command) in the message transmitted across the TDM network leg. Each non-standard element includes the beginning octet marker or identifier (0×FE or 0×FF), element length in bytes, country code/vendor identifiers defined within ITU standard T.35, followed by the data to be transferred. The country code/vendor id values are used to differentiate the data contained with the non-standard element, but can be read by any equipment receiving the H.221 BAS (bit-rate allocation signal) performing termination of an H.320 call leg. The encoded bandwidth value being passed across the H.320 leg is included after the 0×FF identifier.

Figure 2:
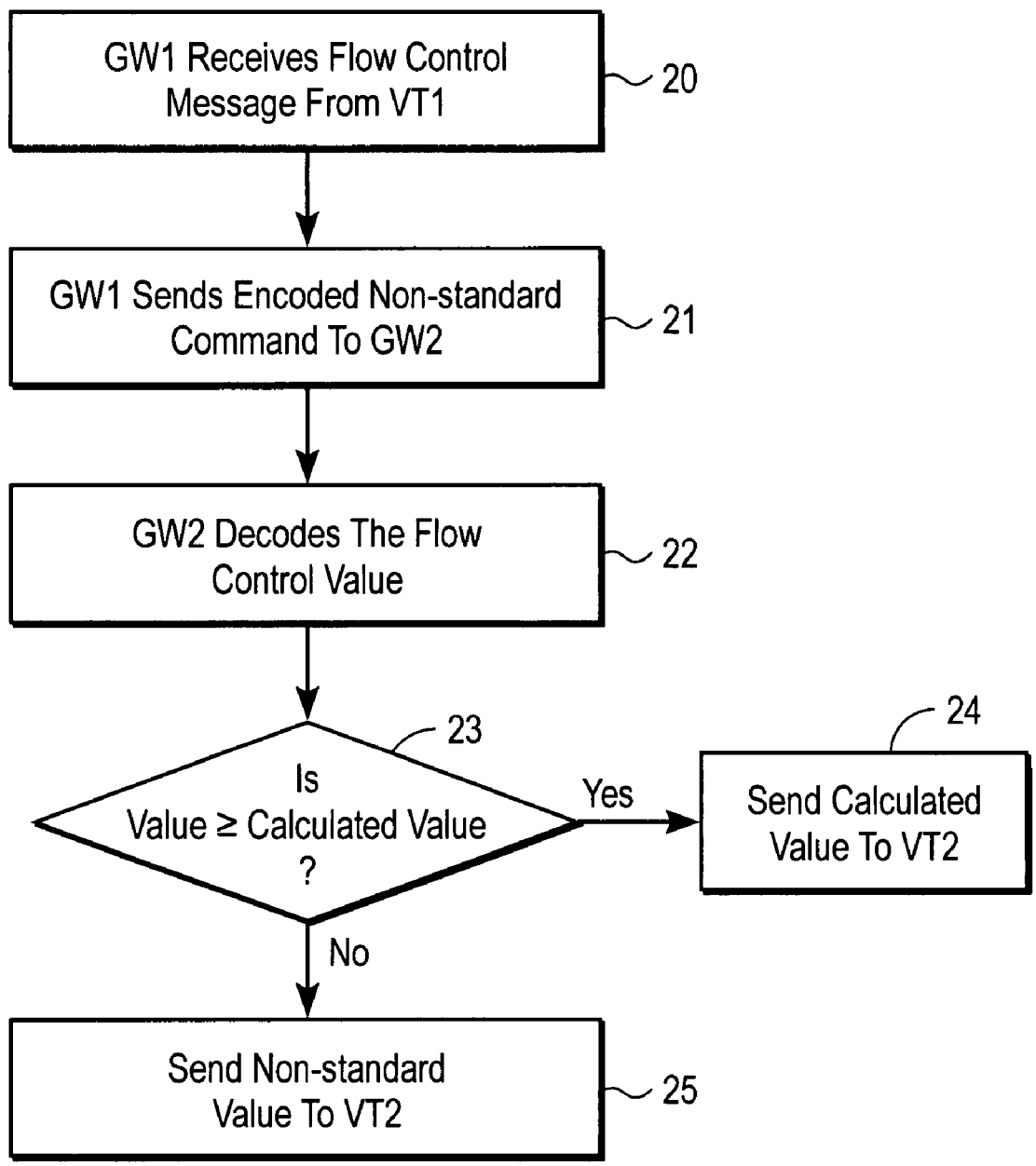
FIG. 2 illustrates an example method of handling a flow control message by a gateway device in the network of FIG. 1.

FIG. 2 illustrates an example method of handling a flow control message by a gateway device in the network of FIG. 1. The process starts with gateway device 14 (GW1) receiving a flow control message sent from video terminal 11 (VT1) in a format compatible with H.245 (block 20). The flow control message, for example, may indicate that the available video bandwidth for VT1 is 200 Kbps. Upon receiving this message, GW1 decodes the H.245 message, identifies the bandwidth limitation value, and then encodes a non-standard command using H.221 with the value of 200 Kbps. The non-standard command with the encoded bandwidth value is then sent by GW1 to gateway device 16 (GW2) over the H.320 call leg (block 21).

On the receiving end, GW2 decodes the flow control value received over the H.320 call leg from GW1 (block 22). At this stage, GW2 may compare the 200 Kbps value with the maximum calculated value for the H.320 leg. In other words, GW2 may query if the received value is greater than or equal to the calculated value (block 23). The maximum video bandwidth may be calculated from the number of TDM trunks in the call, minus any audio and data bandwidth. Each gateway (on both sides of the H.320 call leg) is operable to calculate the bandwidth value separately.

In the event that the received value is greater than or equal to the calculated value, then GW2 sends the calculated value to video terminal 18 (VT2) (block 24). If we assume that the absolute maximum bandwidth calculated between the two gateway devices is 320 Kbps, then the received value (200 Kbps) is less than the calculated value (320 Kbps). That means that after comparing the non-standard value (200 Kbps) versus the maximum calculated value for the H.320 leg (320 Kbps), GW2 sends a flow control message to VT2 indicating 200 Kbps as the maximum bandwidth value that VT1 can support at this time (block 25). Thus, VT2 is informed that VT1 presently has an available video bandwidth of 200 Kbps. In this manner, IP video calls with an H.320 leg may support full video flow control between endpoints.

Continuing with the above example, now assume that VT1 sends another flow control message to GW1, this time with a value of 400 Kbps, indicating a greater available video bandwidth. As before, responsive to receiving this H.323 flow control message from VT1, GW1 encodes a non-standard command in H.221 with a value of 400 Kbps, and sends it over the H.320 call leg to GW2. GW2 then detects the non-standard command, and decodes the flow control value (i.e., 400 Kbps). GW2 then compares the non-standard value (400 Kbps) against the maximum calculated value for the H.320 call leg (320 Kbps). Since the calculated value is less than the non-standard value, GW2 sends a H.323 flow control message to VT2 indicating 320 Kbps as the maximum video bandwidth available over the H.320 call leg.

Figure 3:
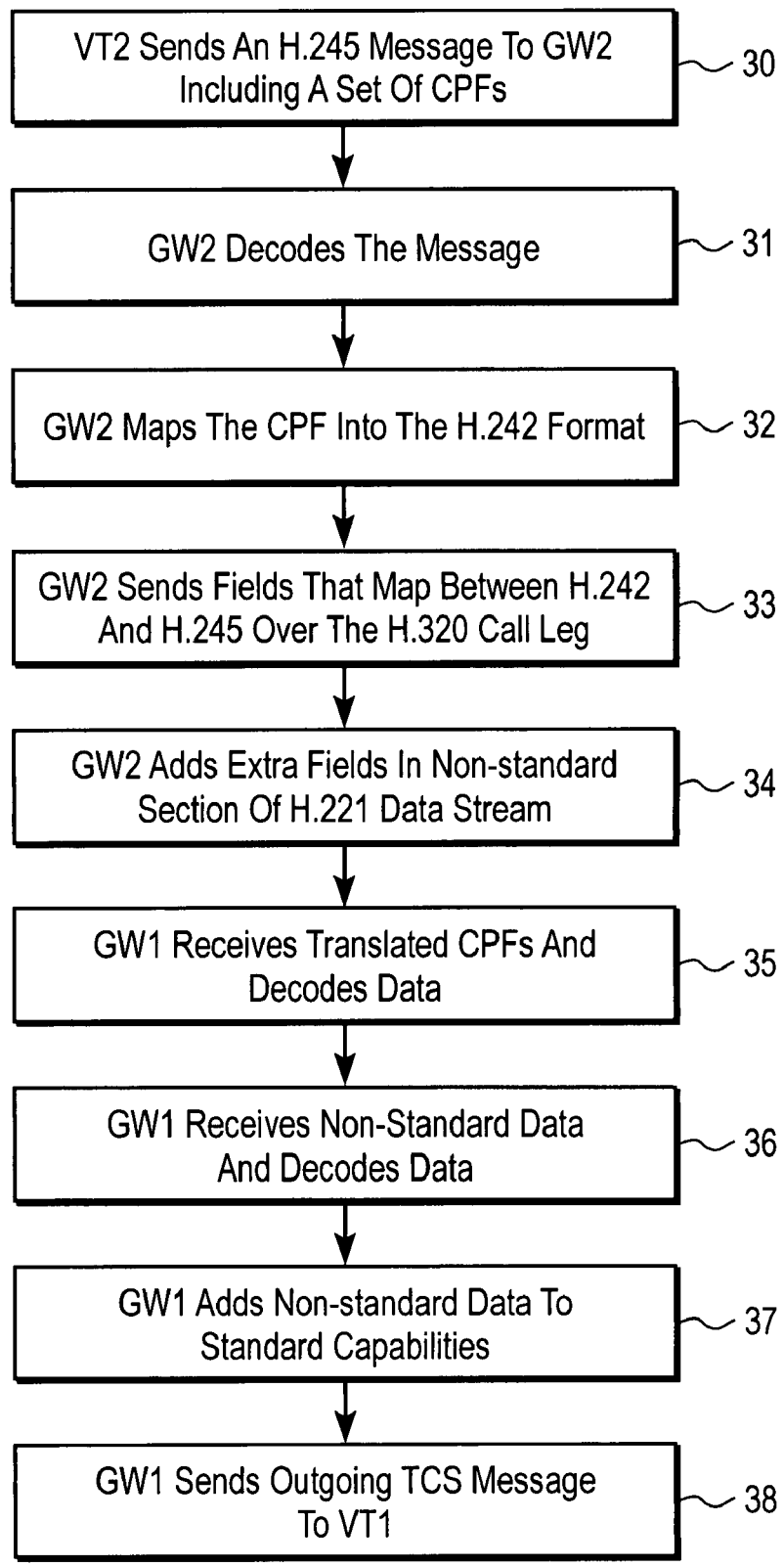
FIG. 3 illustrates an example method of handling video codec information by a gateway device in the network of FIG. 1.

FIG. 3 illustrates an example method of handling video codec information by a gateway device in the network of FIG. 1. This example begins with VT2 sending an H.245 Terminal Capability Set (TCS) message to GW2 (block 30). This message may be sent to GW2 using ITU H.245 encoding, which may include an H.263 video capability with a set of optional Custom Picture Formats (CPFs). Next, GW2 decodes the H.245 message and the H.263 capability (block 31). For example, the H.263 capability may comprise Standard MPI and Pixel Aspect Ratio Code (PAR) fields within the CPF.

Once decoded, GW2 then encodes the H.263 capability into the H.242 format to pass over an H.320 call leg (block 32). GW2 sends fields that map directly between the H.242 and H.245 protocols over the H.320 call leg in a standard capabilities section (block 33). Extra fields that cannot be mapped are added in a non-standard capabilities section of an H.221 data stream (block 34). In one embodiment, the identifier 0xFE precedes the non-standard capabilities. GW1 receives the H.263 data (i.e., the translated CPFs) in the standard capabilities section and decodes the data (block 35). GW1 then receives the non-standard capabilities section of the H.221 serial data stream and decodes that data (block 36).

At this point, GW1 adds the non-standard capabilities data to the standard H.263 capabilities (block 37). GW1 then sends an outgoing TCS message containing the combined or additive data to VT1 (block 38). It should be understood that due to the extra non-standard capabilities sent in the H.221 data stream, the CPFs in the incoming TCS message received by GW2 are identical to that of the outgoing TCS message sent by GW1. In addition, the non-standard H.263 information is encoded in a method that allows for the exact ordering of the CPFs arriving in GW2 to be reassembled in the outgoing GW1 TCS. This CPF ordering information is lost when the H.263 capabilities are transferred between H.245 and H.221/H.242 on GW2, due to the method of encoding H.263 capabilities defined in H.242.

Figure 4:
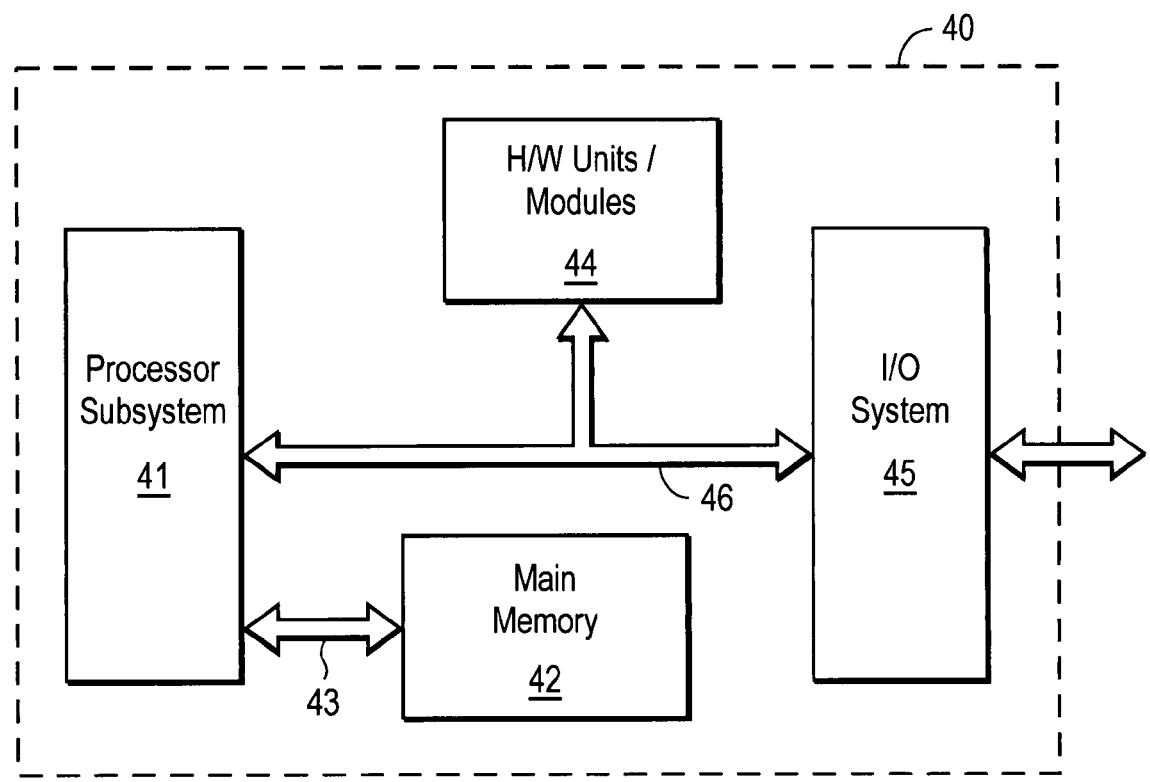
FIG. 4 illustrates basic components of an example node or network device.

FIG. 4 illustrates basic components of an example network device or node 40 (e.g., a gateway device). Node 40 typically comprises a number of basic subsystems that includes a processor subsystem 41, a main memory 42 and an input/output (I/O) subsystem 45. Data is transferred between main memory ("system memory") 42 and processor subsystem 41 over a memory bus 43, and between the processor and I/O subsystems over a system bus 46. Examples of the system bus may include the conventional lightning data transport (or hyper transport) bus and the conventional peripheral component interconnect (PCI) bus. Node 40 may also comprise other hardware units/modules 44 coupled to system bus 46 for performing additional functions. Processor subsystem 41 may comprise one or more processors and a controller device that incorporates a set of functions including a system memory controller, support for one or more system buses and direct memory access (DMA) engines.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnetic or optical cards, or other type of machine-readable medium suitable for storing electronic instructions. Elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For example, the methods described above are also applicable when the video terminal-to-gateway connection operates in accordance with a protocol other than H.323 that supports flow control. Furthermore, the methods described herein are also applicable to gateway-to-gateway call legs other than ISDN call legs, such as SS7 and other PSTN clear channel digital circuits. Accordingly, the specification and drawings are to be regarded in an illustrative rather than a restrictive sense.

We claim:

1. A method comprising:
   receiving, by a first gateway device, a flow control message sent by a first video terminal over an Internet Protocol (IP) network in accordance with a first video telecommunications protocol, the flow control message containing an available bandwidth value of the first video terminal;
   encoding, by the first gateway device, the available bandwidth value of the flow control message as non-standard command information of a second video telecommunications protocol; and
   sending the non-standard command information over a circuit-switched network call leg in accordance with the second video telecommunications protocol to a second gateway device, the second gateway device sending the available bandwidth value to a second video terminal using the first video telecommunications protocol in the event that the available bandwidth value is less than a maximum calculated bandwidth of the circuit-switched network call leg.

2. The method of claim 1 wherein the first video telecommunications protocol is compatible with H.323.

3. The method of claim 1 wherein the circuit-switched network call leg comprises one or more Time Division Multiplex (TDM) trunks.

4. The method of claim 1 wherein the circuit-switched network call leg comprises an Integrated Services Digital Network (ISDN) call leg and the second video telecommunications protocol is compatible with H.320.

5. The method of claim 1 wherein an identifier precedes the non-standard command information.

6. The method of claim 1 wherein the second gateway device sends the maximum calculated bandwidth to the second video terminal using the first video telecommunications protocol in the event that the available bandwidth value is greater than the maximum calculated bandwidth of the circuit-switched network call leg.

7. A method comprising:
   detecting, by a second gateway device, a non-standard command in H.221 sent by a first gateway device to the second gateway device over a H.320 call leg, the non-standard command including a first bandwidth value of a first video terminal;
   decoding, by the second gateway device, the first bandwidth value from the non-standard command;
   comparing, by the second gateway device, the first bandwidth value against a calculated bandwidth value for the H.320 call leg; if the first bandwidth value is less than the calculated bandwidth value, then
  sending, by the second gateway device, a flow control message with the first bandwidth value in H.323 to a second video terminal over an Internet Protocol (IP) network; otherwise
  sending, by the second gateway device, a flow control message with the calculated bandwidth value in H.323 to the second video terminal over the Internet Protocol (IP) network.

8. The method of claim 7 wherein the calculated bandwidth value comprises a maximum bandwidth value of the H.320 call leg.

9. The method of claim 7 wherein the first bandwidth value comprises an available video bandwidth value of the first video terminal.

10. The method of claim 7 wherein the H.320 call leg comprises an Integrated Services Digital Network (ISDN) call leg.

11. The method of claim 7 further comprising calculating, by the second gateway device, the calculated bandwidth value.

12. Logic encoded in one or more media, when executed by a processor, cause the processor to perform operations comprising:
  detect a non-standard command received over a H.320 call leg from a gateway device, the non-standard command including an available bandwidth value of a first video terminal;
  decode the first bandwidth value from the non-standard command; and
    send a flow control message with the available bandwidth value in H.323 to a second video terminal over an Internet Protocol (IP) network in the event that the available bandwidth value is less than the calculated bandwidth value; otherwise
    send a flow control message with a calculated bandwidth value in H.323 to the second video terminal over the Internet Protocol (IP) network.

13. The logic of claim 12 wherein the non-standard command is sent by the gateway device in H.221.

14. The logic of claim 13 further comprising:
  compute the calculated bandwidth value; and
  compare the available bandwidth value against the calculated bandwidth value.

15. A system comprising:
  a first gateway device operable to communicate with a first video terminal in accordance with H.323;
  a second gateway device operable to communicate with a second video terminal in accordance with H.323, the first gateway device also being operable to communicate with the second gateway device over an H.320 call leg; and
  wherein, responsive to a first message received from the first video terminal that contains a terminal capability in H.245, the first gateway being further operable to map the terminal capability into a non-standard section of an H.221 data stream and send the H.221 data stream to the second gateway device, the second gateway device being further operable to decode the terminal capability from the non-standard section of the H.221 data stream, encode the terminal capability in H.245 in a second message, and send the second message to the second video terminal.

* * * * *